United States Patent Office 2,781,365
Patented Feb. 12, 1957

2,781,365

17α-HYDROXY-19-NORPROGESTERONE, PROCESS THEREFOR AND INTERMEDIATES OBTAINED THEREBY

Carl Djerassi, Birmingham, Mich., and Franz Sondheimer and George Rosenkranz, Mexico City, Mexico, assignors to Syntex, S. A., Mexico City, Mexico, a corporation of Mexico No Drawing. Application April 23, 1954,
Serial No. 425,310

Claims priority, application Mexico April 25, 1953

8 Claims. (Cl. 260—397.4)

The present invention relates to the production of novel cyclopentanophenanthrene derivatives and to a novel process for the production thereof.

More particularly the present invention relates to the production of the novel active cortical hormone 19-nor-17α - hydroxyprogesterone ($\Delta^4$ - 19 - nor - pregnen - 17α-ol - 3,20 - dione) and to the production of novel intermediates convertible thereto. As pointed out in application Serial Number 425,300 filed as of even date herewith 19-nor-17α-hydroxyprogesterone is also useful as an intermediate for the production of the active cortical hormone $\Delta^4$ - 19 - nor - pregnen - 11β, 17α, 21 - triol-3,20-dione by incubation with adrenal tissue.

In accordance with the present invention it has been discovered that a novel intermediate, i. e. the 20-ketal of 3 - methoxy - 17α - hydroxy - 17β - acetyl - 1,3,5(10)-estratriene upon reduction with lithium metal or other alkali metal in liquid ammonia gives a second novel intermediate, i. e. the 20-ketal of 3-methoxy-17α-hydroxy-$\Delta^{2,5(10)}$-19-nor-pregnadien-20-one which may then be converted to the novel cortical hormone 19-nor-17α-hydroxyprogesterone.

It has further been discovered in accordance with the present invention that the intermediate 20-ketal of 3-methoxy - 17α - hydroxy - 17β - acetyl - 1,3,5(10) - estratriene may be prepared by novel methods from the known compounds 3 - hydroxy - 17β - acetyl - 1,3,5(10), 16-estratetraene and 3,17β-dihydroxy-17-acetyl-1,3,5(10)-estratriene disclosed in the publication of Djerassi et al., J. A. C. S. 73, 1526 (1951).

A portion of the process of the present invention is set forth in the following equation wherein lithium metal is used as the reducing agent by way of illustration although other alkali metals may also be used:

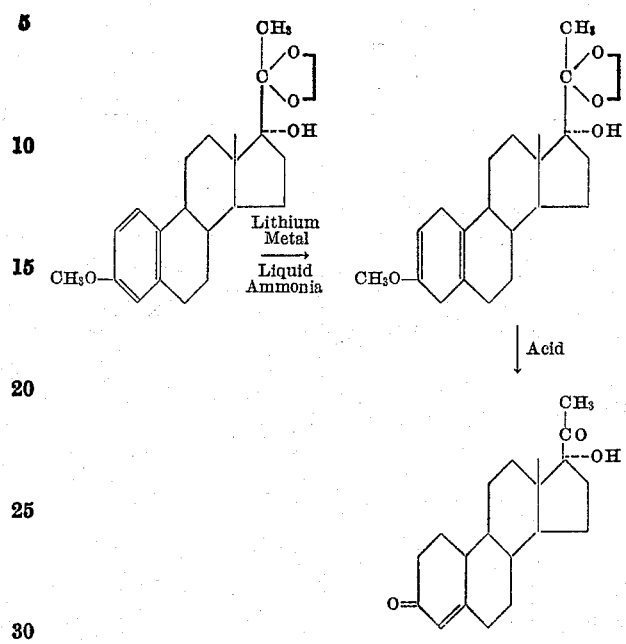

In practicing the steps above set forth the 20-ketal of 3 - methoxy - 17α - hydroxy - 17β - acetyl - 1,3,5(10)-estratriene was dissolved in an organic solvent such as anhydrous ether and added dropwise to lithium metal dissolved in liquid ammonia. After a short time methanol was added and the ammonia was then allowed to evaporate overnight at room temperature. After purification as hereinafter set forth the 20-ketal of 3-methoxy-17α - hydroxy - 17β - acetyl - $\Delta^{2,5(10)}$ - estradiene was obtained. Hydrolysis and rearrangement of this ketal with an acid such as hydrochloric acid produced $\Delta^4$-19-nor-pregnen-17α-ol-3,20-dione (19-nor-17α-hydroxyprogesterone).

The 20-ketal of 3-methoxy-17α-hydroxy-17β-acetyl-1,3,5(10)-estratriene may be prepared from either 3-hydroxy-17β-acetyl-1,3,5(10),16-estratetraene or 3,17α-dihydroxy-17-acetyl-1,3,5(10)-estratriene as outlined in the following equation:

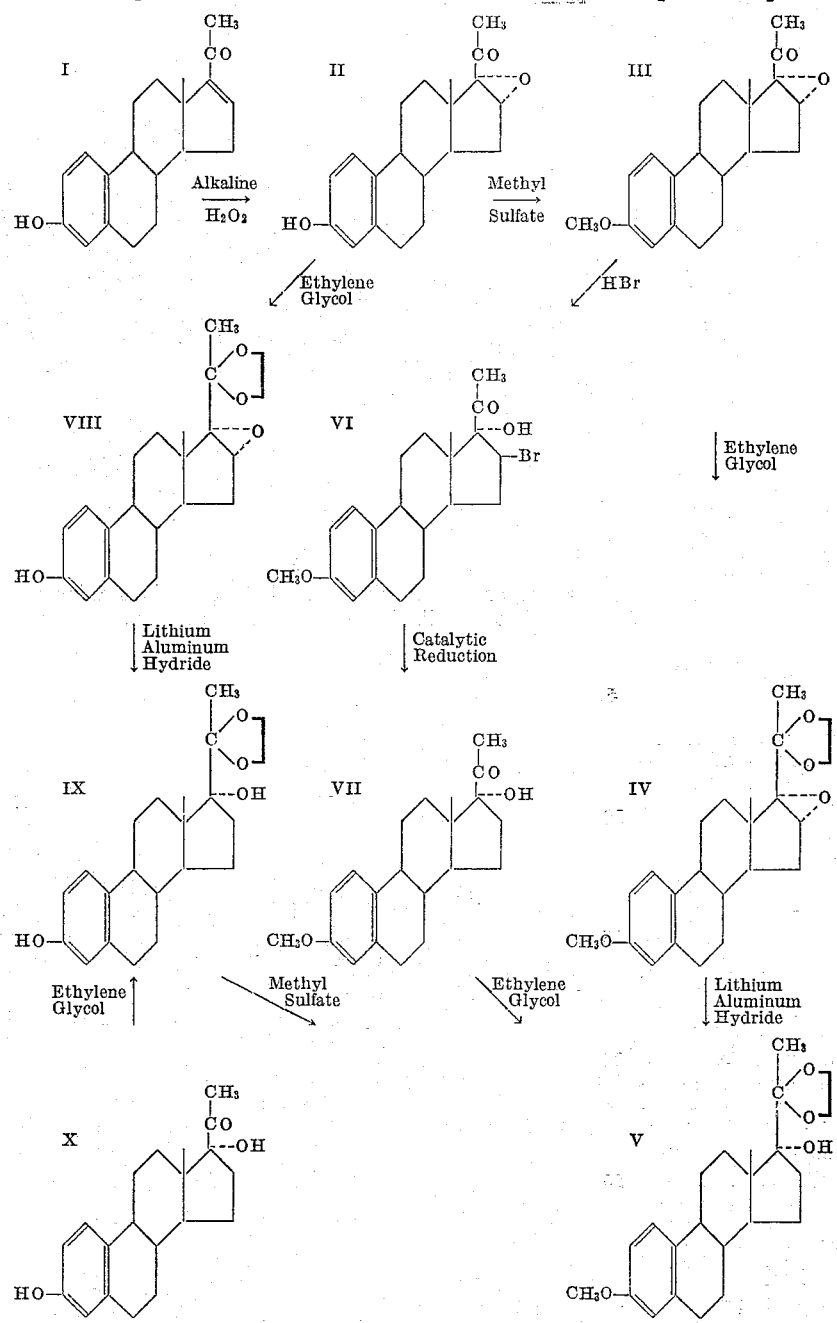

the reaction with the glycol to form the ketal (II to VIII) is performed prior to the reaction with methyl sulfate and As may be noted by referring to the foregoing equation the 20-ketal of 3-methoxy-17α-hydroxy-17β-acetyl-1,3,5-(10)-estratriene indicated as V may be prepared from 3 - hydroxy - 17β - acetyl - 1,3,5(10),16 - estratetraene indicated as I by either of the paths, I, II, III, IV and V, or I, II, III, VI, VII and V, or I, II, VIII, X and V. The first two of these are essentially similar, differing only in that the 20-keto group of compound III is first converted to a ketal as in compound IV and the 16α, 17α-oxido group is then reduced with lithium aluminum hydride, whereas in the second path the 16α, 17α-oxido group of compound III is converted to the corresponding bromohydrin with HBr to form compound VI, the bromine is then removed by catalytic reduction to form compound VII and then this last compound is reacted with ethylene glycol for example to form compound V. The last of the three paths enumerated is entirely similar to the first path except that the order of the various steps is changed. Thus, the reduction of the oxido group with lithium aluminum hydride also precedes the reaction with methyl sulfate.

In addition to the above discussed procedures for the preparation of the compound indicated as V, it may be noted that by starting from 3,17α-dihydroxy-17-acetyl-1,3,5(10)-estratriene (X) which is already provided with a 17α-hydroxy group certain steps may be eliminated and only the reaction with the glycol (X to IX) followed by reaction with methyl sulfate (IX to V) is necessary.

It may be noted further that the conditions involved in each of the similar steps above outlined are the same in all essential respects. For the reaction of 3β-hydroxy-17β-acetyl-1,3,5(10),16-estratetraene (I) with hydrogen peroxide, the steroid is dissolved in an organic solvent such as methanol, the solution cooled and hydrogen peroxide as well as aqueous alkali such as sodium hydroxide added separately and slowly thereto. The reaction mixture was allowed to stand in the cold for a short time and then overnight at room temperature. After purification the product was 16α,17α-oxido-3β-hydroxy-17β-acetyl-1,3,5(10)-estratriene (II).

For the reaction with methyl sulfate of 16α,17α-oxido-3β-hydroxy-17β-acetyl-1,3,5(10)-estratriene (II) to form 16α,17α-oxido-3-methoxy-17β-acetyl-1,3,5(10)-estratriene (III) or the 20-ketal of 3,11α-dihydroxy-17β-acetyl-1,3,5-(10)-estratriene IX to give the compound V, the starting steroid was dissolved in an organic solvent such as methanol and treated with a strong base such as potassium hydroxide and methyl sulfate.

In order to form the 20-ketal group the starting steroid such as 16α,17α-oxido-3-methoxy-17β-acetyl-1,3,5(10)-estratriene (III) or 16α,17α-oxido-3β-hydroxy-17β-acetyl-1,3,5(10)-estratriene (II) or 3-methoxy-17α-hydroxy-17β-acetyl-1,3,5(10)-estratriene (VII) or 3,17α-dihydroxy-17β-acetyl-1,3,5(10)-estratriene (X) was dissolved in an organic solvent, such as benzene, containing ethylene glycol and a catalytic amount of a strong organic acid such as p-toluenesulfonic acid and refluxed for a prolonged period such as ten hours. Purification gave the corresponding compounds IV, VIII, V and IX respectively.

The 16α,17α-oxido group as may be noted from the equation can be converted to a 17α-hydroxy group by reduction with lithium aluminum hydride (compound IV to V and compound VIII to IX) or by adding HBr followed by catalytic reduction to remove the 17-bromo group of the bromohydrin (compound III to VI to VII). For the reaction with lithium aluminum hydride the starting steroid the 20-ketal of 16α,17α-oxido-3-methoxy-17β-acetyl-1,3,5(10)-estratriene (IV) or the 20-ketal of 16α,17α-oxido-3β-hydroxy-17β-acetyl-1,3,5(10)-estratriene (VIII) is dissolved in an anhydrous organic solvent such as tetrahydrofurane and refluxed with lithium hydride which is added in an organic solvent such as ether. The excess hydride is decomposed, and the products (V or IX) precipitated and purified.

For the reaction of 16α,17α-oxido-3-methoxy-17β-acetyl-1,3,5(10)-estratriene (III) with HBr the compound is dissolved in acetic acid and a solution of hydrobromic acid in acetic acid added thereto while the temperature is maintained just below room temperature. The solution is then allowed to stand for a short time at room temperature and is then poured into cold water to precipitate the bromohydrin i. e. 16-bromo-3-methoxy-17α-hydroxy-17β-acetyl-1,3,5(10)-estratriene (VI). The bromohydrin is then treated with hydrogen in the presence of a hydrogenation catalyst, preferably a palladium catalyst until 1 mol of hydrogen is absorbed. Upon purification the compound VII is produced.

The following specific examples serve to illustrate but are not intended to limit the present invention:

*Example I*

To a solution of 3 g. of 3-hydroxy-17-acetyl-1,3,5(10),-16-estratetraene (I) in 100 cc. of methanol, cooled in an ice bath, was added dropwise and simultaneously from two separatory funnels 6 cc. of 30% hydrogen peroxide and a solution of 4 g. of sodium hydroxide in 15 cc. of water. The two solutions were added in a period of approximately 15 minutes. The mixture was kept for 30 minutes in the cold and then overnight at room temperature. After diluting with water and acidifying the product was extracted with chloroform and the chloroform solution was dried over sodium sulphate and evaporated to dryness. Recrystallization from chloroform-methanol yielded 3 g. of the 16,17-epoxide (II) with a melting point of 234°–236° C.; $[\alpha]_D$ +124° (chloroform).

*Example II*

A boiling solution of 2.5 g. of the 16,17-epoxide (II), obtained in accordance with Example I, in 180 cc. of methanol was alternatively treated with four portions of 7 cc. of 50% potassium hydroxide and 7 cc. of methyl sulfate. After ten minutes, the solution was cooled, diluted with water and the precipitate was collected and well washed with water. Crystallization from acetone-hexane afforded 2.5 g. of the methyl ether (III) with melting point 142°–145° C.; $[\alpha]_D$ +125° (chloroform).

*Example III*

A solution of 3 g. of the methyl ether (III), obtained in accordance with the previous example, in 60 cc. of benzene containing 6 cc. of ethylene glycol and a trace of p-toluenesulfonic acid, was refluxed for ten hours using an adapter for the removal of the water formed in the course of the reaction. Dilute potassium hydroxide solution was added and the benzene layer was repeatedly washed with water, dried and evaporated to dryness. Recrystallization from acetone-hexane gave the 20-ketal (IV).

*Example IV*

0.3 g. of lithium aluminum hydride in 10 cc. of anhydrous ether was added to a solution of 3 g. of the ketal, obtained in accordance with the previous example, in 50 cc. of tetrahydrofurane. The solution was refluxed for one hour and the excess of hydride was decomposed by the addition of ethyl acetate. Then a saturated solution of sodium sulfate was added, followed by 3 g. of solid sodium sulfate. The precipitate was filtered and washed with ether and the combined filtrates were evaporated to dryness. Crystallization from acetone-pentane afforded the 20-ketal of 3-methoxy-17α-hydroxy-17β-acetyl-1,3,5-(10)-estratriene (V) with melting point 124°–126° C.; $[\alpha]_D$ +44° (chloroform).

*Example V*

3 g. of the 16,17-epoxide (II) obtained in accordance with Example I, was treated with ethylene glycol by the procedure described in Example III. The resulting ketal (VIII) was treated with lithium aluminum hydride by the procedure described in Example IV, to give the 20-ketal of 3,17α-dihydroxy-17β-acetyl-1,3,5(10)-estratriene (IX), which on treatment with methyl sulfate, by the procedure described in Example II, produced the 20-ketal of 3-methoxy-17α-hydroxy-17β-acetyl-1,3,5(10)-estratriene (V) identical to the one obtained in accordance with Example IV.

*Example VI*

3 g. of 3,17α-dihydroxy-17β-acetyl-1,3,5(10)-estratriene (X) was treated with ethylene glycol, by the procedure described in Example III to give 1.7 g. of the 20-ketal (IX), identical to the one obtained in accordance with Example V.

*Example VII*

To a solution of 1 g. of 3-methoxy-16α,17α-oxide-17β-acetyl-1,3,5(10)-estratriene (III) prepared according to Example II, in 10 cc. of acetic acid, there were added 2 cc. of a 32% hydrobromic acid solution in acetic acid while maintaining the temperature constant between 15° and 18° C. The solution was allowed to stand for 15 minutes at room temperature and is emptied into 15 times its volume of iced water with agitation in order to obtain a uniform precipitation. The precipitate was filtered, washed to neutrality and dried at room temperature. The yield of bromohydrin (VI) was almost quantitative.

1 g. of the bromohydrin thus obtained was agitated in an atmosphere of hydrogen at atmospheric pressure with 3 g. of 2% previously reduced palladium hydroxide upon calcium carbonate and 20 cc. of ethanol previously distilled over Raney nickel. In the course of two hours there was absorbed the equivalent of one mol of hydrogen. The precipitate was filtered and washed with water. The dry product was crystallized from acetone-hexane. 0.8 g. of 3-methoxy-17α-hydroxy-17β-acetyl-1,3,5(10)-estratriene (VII) with a melting point of 150°–152° C. $[\alpha]_D$ −45° (chloroform) was obtained.

Example VIII

To 3.3 g. of 3-methoxy-17α-hydroxy-17β-acetyl-1,3,5(10)-estratriene (VIII) dissolved in 200 cc. of anhydrous benzol there was added 40 cc. of ethylene glycol and 0.22 g. of p-toluenesulfonic acid. The solution was refluxed with stirring for 8 hours, chilled, then washed with a solution of sodium bicarbonate and water and evaporated to dryness. By crystallization from pentane there was obtained the 20-ketal of 3-methoxy-17α-hydroxy-17β-acetyl-1,3,5(10)-estratriene (V) in a yield of 3.03 g. with a melting point of 120°–123° C. $[\alpha]_D$ +40° (chloroform) identical to that obtained according to Examples IV, V and VI.

Example IX 1.4 g. of lithium metal (wire) was dissolved in 150 cc. of liquid ammonia in a Dewar flask fitted with a mechanical stirrer, and then a solution of 1.4 g. of the 20-ketal of 3 - methoxy - 17α - hydroxy - 17β - acetyl - 1,3,5(10)-estratriene, in 150 cc. of anhydrous ether was added dropwise in the course of approximately five minutes. After ten minutes longer, 16 cc. of absolute methanol was added dropwise in the course of 20 minutes. The ammonia was allowed to evaporate overnight at room temperature and the residue was collected with cold water and extracted with ethyl ether. The ether extract was washed to neutral, dried and evaporated to dryness. Recrystallization from acetone-hexane yielded 1.0 g. of the 20-ketal of 3-methoxy-17α-hydroxy-17β-acetyl-$\Delta^{2,5(10)}$-estradiene melting point 175°–176° C. (Kofler); $[\alpha]_D$ +74° (chloroform).

Example X 30 cc. of a 3 N solution of hydrochloric acid was added to a solution of 1 g. of the 20-ketal of 3-methoxy-17α-hydroxy-19-nor-$\Delta^{2,5(10)}$-pregnadien-20-one in 50 cc. of methanol and the mixture was heated at a temperature of 60° C. for 15 minutes. The cooled mixture was mixed with water and ether and the ether layer was washed with sodium bicarbonate solution and water until neutral, dried over sodium sulfate and evaporated to dryness. Upon crystallization from acetone $\Delta^4$-19-nor-pregnen-17α-ol-3,20-dione is obtained having a melting point of 204°–206° C.; $[\alpha]_D$ +41° (chloroform) which showed the typical ultraviolet absorption maximum at 240 mμ (log E 4.20).

We claim:

1. A process for the production of 19-nor-17α-hydroxyprogesterone which comprises reducing the 20-ketal of 3 - methoxy - 17α - hydroxy - 17β - acetyl - 1,3,5(10)-estratriene with an alkali metal in liquid ammonia to form the 20-ketal of 3-methoxy-17α-hydroxy-$\Delta^{2,5(10)}$-19-nor-pregnadien-20-one and thereafter hydrolysing and rearranging the last mentioned ketal in an acid medium.

2. The process of claim 1 wherein the alkali metal is lithium.

3. A process for the production of 19-nor-17α-hydroxyprogesterone which comprises treating 3-hydroxy-17β-acetyl-1,3,5(10), 16-estratetraene with hydrogen peroxide in alkaline medium to form 16α,17α-oxido-3-hydroxy-17β-acetyl-1,3,5(10)-estratriene, thereafter forming from the oxido compound the 20-ketal of 3-methoxy-17α-hydroxy-17β-acetyl-1,3,5(10)-estratriene by treating the oxido compound in indifferent order with a methylating agent to form the 3-methoxy group and a ketalizing agent to form the 20-ketal group followed by reduction to convert the oxido group into a 17α-hydroxy group, reducing the 20-ketal compound with an alkali metal in liquid ammonia to form the 20-ketal of 3-methoxy-17α-hydroxy-$\Delta^{2,5(10)}$-19-nor-pregnadien-20-one and thereafter hydrolysing and rearranging the last mentioned ketal in an acid medium.

4. The process of claim 3 wherein the methylating agent is methyl sulfate, the ketalizing agent is ethylene glycol in the presence of p-toluenesulfonic acid, the reducing agent is lithium aluminum hydride and the alkali metal is lithium.

5. A process for the production of 19-nor-17α-hydroxyprogesterone which comprises treating 3-hydroxy-17β-acetyl-1,3,5(10), 16-estratetraene with hydrogen peroxide in alkaline medium to form 16α,17α-oxido-3-hydroxy-17β-acetyl-1,3,5(10)-estratriene, thereafter forming from the oxido compound the 20-ketal of 3-methoxy-17α-hydroxy-17β-acetyl-1,3,5(10)-estratriene by treating the oxido compound with a methylating agent and then with hydrobromic acid to form 16-bromo-3-methoxy-17α-hydroxy-17β-acetyl-1,3,5(10)-estratriene, treating the 16-bromo compound with hydrogen in the presence of a hydrogenation catalyst to remove the 16-bromo group and form 3 - methoxy - 17α - hydroxy - 17β - acetyl-1,3,5(10)-estratriene and treating this last mentioned compound with a ketalizing agent, reducing the 20-ketal compound with an alkali metal in liquid ammonia to form the 20-ketal of 3-methoxy-17α-hydroxy $\Delta^{2,5(10)}$-19-nor-pregnadien-20-one and thereafter hydrolysing and rearranging the last mentioned ketal in an acid medium.

6. The process of claim 5 wherein the methylating agent is methyl sulfate, the ketalizing agent is ethylene glycol in the presence of p-toluenesulfonic acid and the alkali metal is lithium.

7. 16 - bromo - 3 - methoxy - 17α - hydroxy - 17β-acetyl-1,3,5(10)-estratriene.

8. $\Delta^4$-19-nor-pregnene-17α-ol-3,20-dione.

References Cited in the file of this patent

UNITED STATES PATENTS

| | | |
|---|---|---|
| 2,109,400 | Miescher | Feb. 22, 1938 |
| 2,212,104 | Schwenk | Aug. 20, 1940 |
| 2,302,636 | Koster | Nov. 17, 1942 |
| 2,622,081 | Bernstein | Dec. 16, 1952 |